US007822537B2

(12) United States Patent
Perryman et al.

(10) Patent No.: US 7,822,537 B2
(45) Date of Patent: Oct. 26, 2010

(54) DETECTION OF FAULTS IN AN INJECTOR ARRANGEMENT

(75) Inventors: Louisa J. Perryman, Rainham (GB); Martin A. P. Sykes, Rainham (GB); Daniel J. Hopley, Chislehurst (GB)

(73) Assignee: Delphi Technologies Holding S.arl, Troy, MI (US)

( * ) Notice: Subject to any disclaimer, the term of this patent is extended or adjusted under 35 U.S.C. 154(b) by 517 days.

(21) Appl. No.: 11/998,012

(22) Filed: Nov. 28, 2007

(65) Prior Publication Data

US 2008/0129305 A1 Jun. 5, 2008

(30) Foreign Application Priority Data

Nov. 30, 2006 (EP) .................................. 06256140

(51) Int. Cl.
*G06F 19/00* (2006.01)
*F02M 51/00* (2006.01)

(52) U.S. Cl. ........................ 701/114; 123/478; 310/311

(58) Field of Classification Search ................. 701/104, 701/105, 107, 114; 123/498, 478, 480, 494; 324/522; 361/152; 702/115; 310/311, 314, 310/317, 316.03
See application file for complete search history.

(56) References Cited

U.S. PATENT DOCUMENTS

| | | | | |
|---|---|---|---|---|
| 6,384,512 | B1 | 5/2002 | Maeda | |
| 6,522,049 | B2 | 2/2003 | Rueger | |
| 6,705,291 | B2 * | 3/2004 | Rueger et al. | 123/467 |
| 7,640,918 | B2 * | 1/2010 | Perryman et al. | 123/479 |
| 7,709,996 | B2 * | 5/2010 | Hauser et al. | 310/316.03 |
| 2001/0039484 | A1 | 11/2001 | Freudenberg et al. | |
| 2007/0080606 | A1 * | 4/2007 | Hardy et al. | 310/316.03 |
| 2008/0006246 | A1 * | 1/2008 | Perryman et al. | 123/480 |
| 2008/0319699 | A1 * | 12/2008 | Perryman | 702/115 |
| 2009/0090333 | A1 * | 4/2009 | Spadafora et al. | 123/494 |
| 2009/0093944 | A1 * | 4/2009 | Sykes et al. | 701/103 |
| 2009/0121724 | A1 * | 5/2009 | Perryman et al. | 324/522 |

FOREIGN PATENT DOCUMENTS

| | | |
|---|---|---|
| DE | 10028353 | 12/2001 |
| DE | 10314656 | 11/2003 |
| EP | 1139442 | 10/2001 |
| EP | 1420156 | 5/2004 |
| JP | 1-202177 | 8/1989 |
| JP | 2002-10658 | 1/2001 |
| JP | 2002-199748 | 7/2002 |
| JP | 2003-299371 | 10/2003 |
| WO | 2005106227 | 11/2005 |

* cited by examiner

*Primary Examiner*—John T Kwon
(74) *Attorney, Agent, or Firm*—Thomas N. Twomey

(57) ABSTRACT

A method of detecting faults in an injector arrangement in an engine. The injector arrangement comprises at least one fuel injector having a piezoelectric actuator, and the method comprises: charging the piezoelectric actuator during a charge phase ($t_C$); attempting to recharge the piezoelectric actuator during a test phase ($t_T$) which commences after a time interval ($\Delta t$) following the end of the charge phase ($t_C$); sensing a current ($I_S$) that flows through the piezoelectric actuator during the test phase ($t_T$); and generating a short circuit fault signal if the sensed current ($I_S$) reaches a first predetermined threshold current ($I_{SC}$) which is indicative of a short circuit in the piezoelectric actuator.

12 Claims, 6 Drawing Sheets

DETECTION OF FAULTS IN AN INJECTOR ARRANGEMENT

The present invention relates to a method and an apparatus for detecting faults in a fuel injector arrangement, and particularly to a method and an apparatus for detecting short circuit and open circuit faults in a piezoelectric actuator of a fuel injector arrangement.

Automotive vehicle engines are generally equipped with fuel injectors for injecting fuel (e.g., gasoline or diesel fuel) into the individual cylinders or intake manifold of the engine. The engine fuel injectors are coupled to a fuel rail which contains high pressure fuel that is delivered by way of a fuel delivery system. In diesel engines, conventional fuel injectors typically employ a valve needle that is actuated to open and to close in order to control the amount of fluid fuel metered from the fuel rail and injected into the corresponding engine cylinder or intake manifold.

One type of fuel injector that offers precise metering of fuel is the piezoelectric fuel injector. Piezoelectric fuel injectors employ piezoelectric actuators made of a stack of piezoelectric elements arranged mechanically in series for opening and for closing an injection valve needle to meter fuel injected into the engine. Piezoelectric fuel injectors are well known for use in automotive engines.

The metering of fuel with a piezoelectric fuel injector is generally achieved by controlling the electrical voltage potential applied to the piezoelectric elements to vary the amount of expansion and contraction of the piezoelectric elements. The amount of expansion and contraction of the piezoelectric elements varies the travel distance of a valve needle and, thus, the amount of fuel that is passed through the fuel injector. Piezoelectric fuel injectors offer the ability to meter precisely a small amount of fuel.

Typically, the fuel injectors are grouped together in banks of one or more injectors. As described in EP1400676, each bank of injectors has its own drive circuit for controlling operation of the injectors. The circuitry includes a power supply, such as a transformer, which steps-up the voltage generated by a power source, i.e. from 12 Volts to a higher voltage, and storage capacitors for storing charge and, thus, energy. The higher voltage is applied across the storage capacitors which are used to power the charging and discharging of the piezoelectric fuel injectors for each injection event. Drive circuits have also been developed, as described in WO 2005/028836A1, which do not require a dedicated power supply, such as a transformer.

The use of these drive circuits enables the voltage applied across the storage capacitors, and thus the piezoelectric fuel injectors, to be controlled dynamically. This is achieved by using two storage capacitors which are alternately connected to an injector arrangement. One of the storage capacitors is connected to the injector arrangement during a discharge phase when a discharge current flows through the injector arrangement, initiating an injection event. The other storage capacitor is connected to the injector arrangement during a charge phase, terminating the injection event. A regeneration switch is used at the end of the charge phase, before a later discharge phase, to replenish the storage capacitors.

Like any circuit, faults may occur in a drive circuit. In safety critical systems, such as diesel engine fuel injection systems, a fault in the drive circuit may lead to a failure of the injection system, which could consequentially result in a catastrophic failure of the engine. Examples of such faults include short circuit or open circuit faults in the piezoelectric actuators of the fuel injectors. A robust diagnostic system is therefore required to detect such faults in the piezoelectric actuators, particularly whilst the drive circuit is in use.

An aim of the invention is therefore to provide a diagnostic tool that is capable of detecting critical failure modes, or fault response characteristics, of an injector arrangement, and a method of operating the diagnostic tool.

According to a first aspect of the invention, there is provided a method of detecting faults in an injector arrangement in an engine, the injector arrangement comprising at least one fuel injector having a piezoelectric actuator, and the method comprising: charging the piezoelectric actuator during a charge phase; attempting to recharge the piezoelectric actuator during a test phase commencing after a time interval following the end of the charge phase; sensing a current that flows through the piezoelectric actuator during the test phase; and generating a short circuit fault signal if the sensed current reaches a first predetermined threshold current which is indicative of a short circuit in the piezoelectric actuator.

The method may comprise generating a first control signal during the test phase. The first control signal may be variable between a first state and a second state in response to the sensed current. The first control signal may be chopped between the first state and the second state if the sensed current reaches the first predetermined threshold current, and the short circuit fault signal may be generated when a chop occurs in the first control signal during the test phase.

Open circuit faults may also be detected. To detect open circuit faults, the method may comprise discharging the piezoelectric actuator during a discharge phase, and sensing the current that flows through the piezoelectric actuator during the discharge phase. An open circuit fault signal may be generated if the sensed current during the discharge phase does not reach a second predetermined threshold current.

A second control signal may be generated during the discharge phase, the second control signal may be variable between a first state and a second state in response to the sensed current during the discharge phase. The second control signal may be chopped between the first state and the second state if the sensed current exceeds the second predetermined threshold current, and an open circuit fault signal may be generated if a chop does not occur in the second control signal during the discharge phase. The open circuit fault signal may be generated if a chop has not occurred in the second control signal after a predetermined time interval following the start of the discharge phase.

The time interval may depend on an angle of rotation of a crankshaft of the engine, which may in turn depend on the engine speed and/or load.

According to a second aspect of the invention, there is provided an apparatus for detecting faults in an injector arrangement, the injector arrangement comprising at least one fuel injector having a piezoelectric actuator, and the apparatus comprising: charge means for charging the piezoelectric actuator; current sensing means for sensing a current through the piezoelectric actuator; and control means arranged to cause the charge means to connect to the piezoelectric actuator during the charge phase and re-connect to the piezoelectric actuator during a test phase, the test phase commencing after a time interval following the charge phase; wherein the control means is further arranged to generate a short circuit fault signal if the sensed current during the test phase reaches a first predetermined threshold current.

The apparatus may comprise means for generating a first control signal which is chopped between a first state and a second state when the sensed current during the test phase reaches the first predetermined threshold current. The control means may be arranged to generate the short circuit fault signal if a chop occurs in the first control signal during the test phase.

The apparatus may also comprise discharge means for discharging the piezoelectric actuator during a discharge phase, and the control means may be arranged to generate an open circuit fault signal if the sensed current during the discharge phase does not exceed a second predetermined threshold current.

The apparatus may further comprise means for generating a second control signal which is chopped between a first state and a second state if the sensed current during the discharge phase exceeds the second predetermined threshold current, and the control means may be arranged to generate the open circuit fault signal if a chop does not occur in the second control signal during the discharge phase. The control means may further be arranged to generate the open circuit fault signal if a chop has not occurred in the second control signal after a predetermined time interval following the start of the discharge phase.

According to a third aspect of the invention, there is provided a method of detecting faults in an injector arrangement of an engine, the injector arrangement comprising at least one fuel injector having a piezoelectric actuator which is connected in a drive circuit, and the method comprising: charging the piezoelectric actuator during a charge phase; selecting the piezoelectric actuator into the drive circuit and determining the voltage on the selected piezoelectric actuator at the end of the charge phase; deselecting the piezoelectric actuator from the drive circuit and allowing a time period to elapse before selecting the piezoelectric actuator into the drive circuit again and determining the voltage on the selected piezoelectric actuator; calculating a voltage drop or a voltage gradient; and generating a short circuit fault signal if:

(a) the voltage drop is greater than a predetermined voltage drop value, or (b) the voltage gradient is greater than a predetermined voltage gradient value.

The time interval may depend on an angle of rotation of a crankshaft of the engine, which may in-turn depend on an engine speed and/or load.

According to a fourth aspect of the invention, there is provided a drive circuit for detecting faults in an injector arrangement, the injector arrangement comprising at least one fuel injector having a piezoelectric actuator, and the drive circuit comprising: charge means for charging the piezoelectric actuator; injector select means for selecting the piezoelectric actuator into the drive circuit; means for determining a first voltage on the selected piezoelectric actuator immediately after the piezoelectric actuator has been charged, and for determining a second voltage on the selected piezoelectric actuator after a time period following the charging of the piezoelectric actuator; and processing means programmed to calculate a voltage drop or a voltage gradient, and generate a short circuit fault signal if:

(a) the voltage drop is greater than a predetermined voltage drop value, or (b) the voltage gradient is greater than a predetermined voltage gradient value.

The inventive concept encompasses a computer program product comprising at least one computer program software portion which, when executed in an executing environment, is operable to implement the methods described above. The inventive concept also encompasses a data storage medium having the or each computer software portion stored thereon, and a microcomputer provided with said data storage medium.

The invention will now be described, by way of example, with reference to the accompanying drawings, in which:

FIG. 1 is a block diagram illustrating a drive circuit for controlling an injector arrangement comprising a bank of piezoelectric fuel injectors in an engine;

FIG. 2*a* is a circuit diagram illustrating a first embodiment of the drive circuit in FIG. 1;

FIG. 2*b* is a simplified diagram showing the inputs and outputs of a microprocessor used to control the operation of the drive circuit in FIG. 2*a;*

Figure 1:
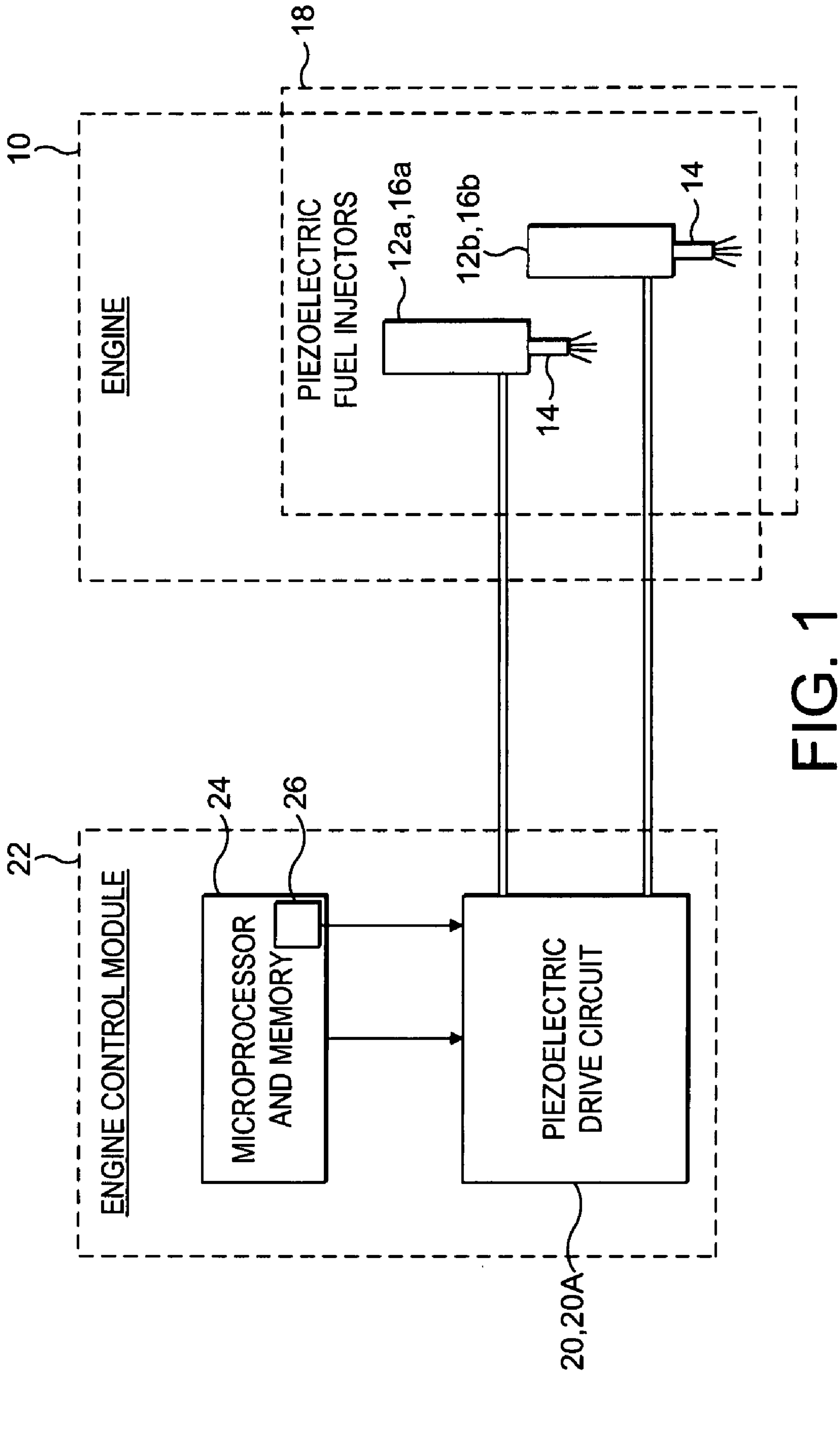

Referring to FIG. 1, an engine 10, such as an automotive vehicle engine, is generally shown having a fuel injector arrangement comprising a first fuel injector 12*a* and a second fuel injector 12*b*. The fuel injectors 12*a*, 12*b* each have an injector valve needle 14 and a piezoelectric actuator 16*a*, 16*b* respectively. The piezoelectric actuators 16*a*, 16*b* are operable to cause the injector valve needle 14 to open and close to control the injection of fuel into an associated cylinder of the engine 10. The fuel injectors 12*a*, 12*b* may be employed in a diesel internal combustion engine to inject diesel fuel into the engine 10, or they may be employed in a spark ignited internal combustion engine to inject combustible gasoline into the engine 10.

The fuel injectors 12*a*, 12*b* form an injector bank 18 and are controlled by means of a drive circuit 20, 20A. In practice, the engine 10 may be provided with more than one injector bank 18, and each injector bank 18 may have one or more fuel injectors 12*a*, 12*b*. For reasons of clarity, the following description relates to only one injector bank 18. In the embodiments of the invention described below, the fuel injectors 12*a*, 12*b* are of a negative-charge displacement type. The fuel injectors 12*a*, 12*b* are therefore opened to inject fuel into the engine cylinder during a discharge phase and closed to terminate injection of fuel during a charge phase.

The engine 10 is controlled by an Engine Control Module (ECM) 22, of which the drive circuit 20, 20A forms an integral part. The ECM 22 includes a microprocessor 24 and a memory 26 which are arranged to perform various routines to control the operation of the engine 10, including the control of the fuel injector arrangement. Signals are transmitted between the microprocessor 24 and the drive circuit 20, 20A, and data which is comprised in the signals received from the drive circuit 20, 20A is recorded in the memory 26. The ECM 22 is arranged to monitor engine speed and load. It also controls the amount of fuel supplied to the injectors 12*a*, 12*b* and the timing of operation of the injectors 12*a*, 12*b*. The ECM 22 is connected to a vehicle battery (not shown) which has a battery voltage of about 12 Volts. Further detail of the operation of the ECM 22 and its functionality in operating the engine 10, particularly the injection cycles of the injector arrangement, is described in detail in WO 2005/028836A1.

Figure 2A:
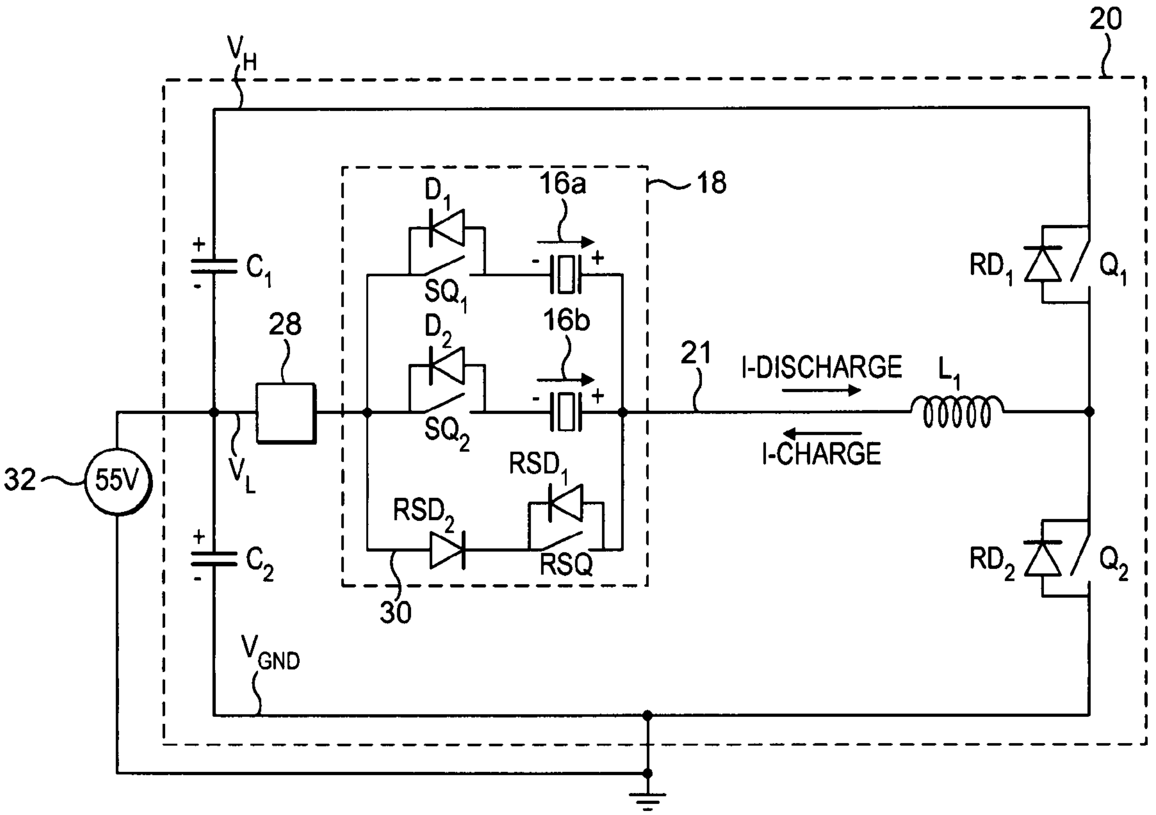

The drive circuit 20, 20A operates in four main phases: a discharge phase, a charge phase, a test phase, and a regeneration phase. During the discharge phase, the drive circuit 20 operates to discharge the piezoelectric actuator 16*a* or 16*b* of one of the fuel injectors 12*a* or 12*b* to open the injector valve needle 14 to inject fuel into the associated engine cylinder. During the charge phase, the drive circuit 20 operates to charge the previously discharged piezoelectric actuator 16*a* or 16*b* to close the injector valve needle 14 of the associated injector 12*a* or 12*b* to terminate the injection of fuel. During the test phase, the drive circuit 20 operates to test if there is a short circuit in any of the piezoelectric actuators 16*a*, 16*b*, and during the regeneration phase, energy in the form of electric charge is replenished to a first storage capacitor $C_1$ and a second storage capacitor $C_2$ (as shown in FIG. 2*a*), for use in subsequent injection cycles. Each of these phases of operation is described in further detail below with reference to FIG. 2*a*.

FIG. 2*a* shows a drive circuit 20 in accordance with a first embodiment of the invention. The drive circuit 20 includes high, low and ground voltage rails $V_H$, $V_L$ and $V_{GND}$ respectively. The drive circuit 20 is generally configured as a half H-bridge with the low voltage rail $V_L$ serving as a bi-directional middle current path 21. The piezoelectric actuators 16*a* and 16*b* of the injectors 12*a*, 12*b* (FIG. 1) are connected in the low voltage rail $V_L$. The piezoelectric actuators 16*a* and 16*b* are located between, and coupled in series with, an inductor $L_1$ and a current sensing and control means 28 which are also connected in the low voltage rail $V_L$.

The piezoelectric actuators 16*a* and 16*b* (hereinafter referred to simply as 'actuators') are connected in parallel. Each actuator 16*a*, 16*b* has the electrical characteristics of a capacitor and is chargeable to hold a voltage which is the potential difference between its charge (+) and discharge (−) terminals. Each actuator 16*a*, 16*b* is connected in series with a respective injector select switch $SQ_1$, $SQ_2$, and each injector select switch $SQ_1$, $SQ_2$ has a diode $D_1$, $D_2$ connected across it.

The injector bank 18 includes a regeneration branch 30 in parallel with the actuators 16*a*, 16*b*. The regeneration branch 30 includes a regeneration switch RSQ, a first diode $RSD_1$ connected across the regeneration switch RSQ and a second diode $RSD_2$ connected in series with the regeneration switch RSQ. The first and second diodes $RSD_1$, $RSD_2$ are opposed to one another so that current can only flow one way through the regeneration branch 30 and then only when the regeneration switch RSQ is closed.

The drive circuit 20 includes a voltage source 32 connected between the low voltage rail $V_L$ and the ground rail $V_{GND}$. The voltage source 32 may be provided by the vehicle battery (not shown) in conjunction with a step-up transformer (not shown) for increasing the voltage from the battery to the required voltage of the low voltage rail $V_L$. In this example, the voltage on the low voltage rail $V_L$ is about 55 volts, and the voltage on the high voltage rail is about 255 volts, however the skilled person would realise that other voltages can be used to similar effect. In general, it is preferred that $V_H$ is about 200 volts in excess of $V_L$. The voltage on the high voltage rail $V_H$ is achieved during the regeneration phase as described in more detail later A first energy storage capacitor $C_1$ is connected between the high and low voltage rails $V_H$, $V_L$, and a second energy storage capacitor $C_2$ is connected between the low and ground voltage rails $V_L$, $V_{GND}$. The capacitors $C_1$, $C_2$ store energy which is used to charge and discharge the actuators 16*a*, 16*b* during the charge and discharge phases respectively. A charge switch $Q_1$ is connected between the high and low voltage rails $V_H$, $V_L$, and a discharge switch $Q_2$ is connected between the low voltage and ground rails $V_L$, $V_{GND}$. Each switch $Q_1$, $Q_2$ has a respective diode $RD_1$, $RD_2$ connected across it for allowing current to return to the capacitors $C_1$, $C_2$ during the regeneration phase.

In essence, the drive circuit 20 comprises a charge circuit and a discharge circuit. The charge circuit comprises the high and low voltage rails $V_H$, $V_L$, the first capacitor $C_1$ and the charge switch $Q_1$, whereas the discharge circuit comprises the low voltage and ground rails $V_L$, $V_{GND}$, the second capacitor $C_2$ and the discharge switch $Q_2$. There now follows a brief description of the discharge, charge and regeneration phases of operation of the drive circuit 20.

To open an injector valve needle 14 (FIG. 1) and commence injection from one of the injectors 12*a* or 12*b*, the drive circuit 20 operates in the discharge phase, wherein one of the actuators 16*a*, 16*b* is discharged. During the discharge phase, an injector 12*a* or 12*b* (FIG. 1) is selected for injection by closing the associated injector select switch $SQ_1$ or $SQ_2$ respectively, the discharge switch $Q_2$ is closed and the charge switch $Q_1$ remains open. For example, to inject from the first injector 12*a*, the first injector select switch $SQ_1$ is closed and current flows from the positive terminal of the second capacitor $C_2$, through the current sensing and control means 28, through the actuator 16*a* of the selected first injector 12*a* (from the low side − to the high side +), through the inductor $L_1$ (in the direction of the arrow 'I-DISCHARGE'), through the discharge switch $Q_2$ and back to the negative side of the second capacitor $C_2$. No current is able to flow through the actuator 16*b* of the unselected second injector 12*b* because of the diode $D_2$ and because the associated injector select switch $SQ_2$ remains open.

To charge the actuators 16*a*, 16*b* during the charge phase, the charge switch $Q_1$ is closed and the discharge switch $Q_2$ remains open. The first capacitor $C_1$, when fully charged, has a potential difference of about 200 volts across it, and so closing the charge switch $Q_1$ causes current to flow around the charge circuit, from the positive terminal of the first capacitor $C_1$, through the charge switch $Q_1$ and the inductor $L_1$ (in the direction of the arrow 'I-CHARGE'), through the actuators 16*a* and 16*b* (from the high sides +to the low sides −) and associated diodes $D_1$ and $D_2$ respectively, through the current sensing and control means 28, and back to the negative terminal of the first capacitor $C_1$. In the charge phase, the previously discharged actuator 16*a* is charged which causes the injector valve needle 14 (FIG. 1) of the injector 12*a* to close to terminate the injection of fuel into the associated cylinder (not shown).

Energy is replenished to the capacitors $C_1$, $C_2$ during the regeneration phase so that the capacitors $C_1$, $C_2$ are ready for use in further charge and discharge phases. To commence the regeneration phase, the regeneration switch RSQ and the discharge switch $Q_2$ are closed whilst the charge switch $Q_1$ remains open. Current from the vehicle battery (not shown) flows around the discharge circuit to charge the second capacitor $C_2$. The discharge switch $Q_2$ is then opened, and because of the inductance of the inductor $L_1$, some current continues to flow through the middle current path 21 for a short while after the discharge switch $Q_2$ is opened. This current flows through the diode $RD_1$ connected across the charge switch $Q_1$ and into the positive terminal of the first capacitor $C_1$ to partially charge the first capacitor $C_1$. The discharge switch $Q_2$ is repeatedly closed and opened to further charge the first capacitor $C_1$ until the potential difference across the first capacitor $C_1$ is increased to about 255 volts. The regeneration process is described in more detail in WO 2005/028836A1.

The drive circuit 20 operates under a "charge-control" method as described in detail in co-pending patent application EP 06254039.8, the contents of which is incorporated herein by reference. The charge-control method involves controlling the current supplied to the actuators 16*a*, 16*b* during the charge and discharge phases, and controlling the duration of the charge and discharge phases; the charge added to the actuators 16*a*, 16*b* during the charge phase, and the charge removed from the actuators 16*a*, 16*b* during the discharge phase is controlled under the relationship charge=current× time (Q=It).

In practice a varying current is driven through the actuators 16*a*, 16*b* during the charge and the discharge phases. The varying current is achieved by the presence of the inductor $L_1$, and by repeatedly opening and closing the charge switch $Q_1$ during the charge phase, and repeatedly opening and closing the discharge switch $Q_2$ during the discharge phase; the switches $Q_1$ and $Q_2$ are opened and closed under the control of the microprocessor 24, in response to signals received from the current sensing and control means 28.

The inductor $L_1$ opposes changing currents. Therefore, during the charge phase, the inductor $L_1$ delays the rise in current flowing around the charge circuit when the charge switch $Q_1$ changes from an open position to a closed position. Similarly, the inductor $L_1$ delays the fall in current when the charge switch $Q_1$ changes from a closed position to an open position; i.e. current continues to flow for a short while after the charge switch $Q_1$ is opened. The inductor $L_1$ has a similar effect during the discharge phase. Opening and closing the charge and discharge switches $Q_1$, $Q_2$ therefore results in a varying current in the charge and discharge circuits respectively.

Figure 3:
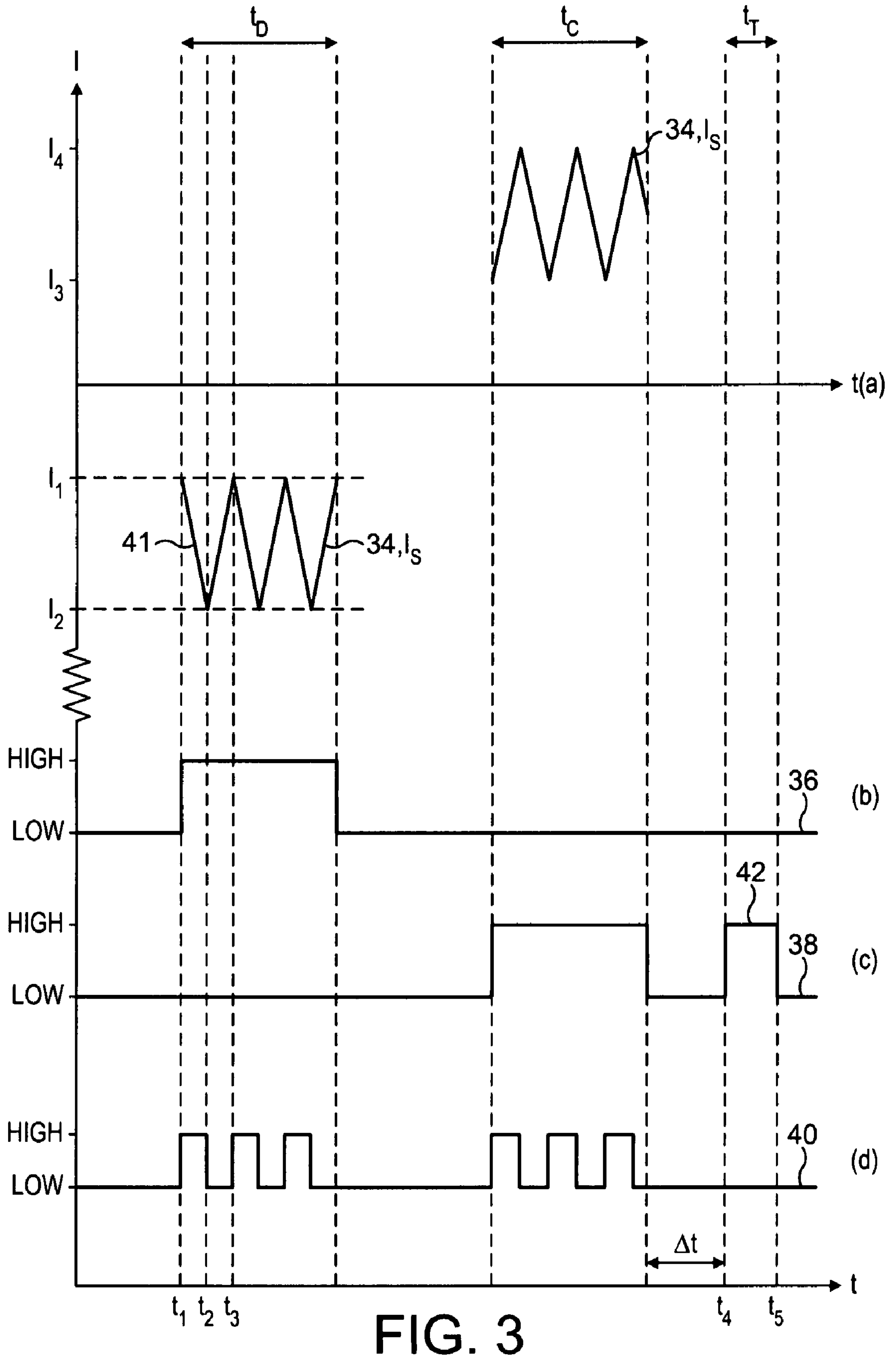
FIG. 3 shows ideal graphs of (a) current versus time, (b) a discharge enable signal, (c) a charge enable signal, and (d) a chopped current control signal, for opening and closing phases of one of the piezoelectric fuel injectors in FIG. 1.

The control of current during the discharge phase and during the charge phase is described below with reference to FIG. 3(*a*) which shows an ideal graph of a varying current 34 generated during the discharge and the charge phases, $t_D$ and $t_C$ respectively, of an actuator 16*a* or 16*b*. The current 34 is shown as positive during the charge phase $t_C$ and negative during the discharge phase $t_D$ because the current flows in opposite directions through the middle current path 21 (FIG. 2*a*) in these two phases. Reference is also made to FIGS. 3(*b*), (*c*) and (*d*) which show, respectively, a discharge enable signal 36, a charge enable signal 38, and a control signal 40. The discharge enable signal 36 and the charge enable signal 38 are output directly from the microprocessor 24, whereas the control signal 40 is output from the current sensing and control means 28 (FIG. 2*a*).

Figure 2B:
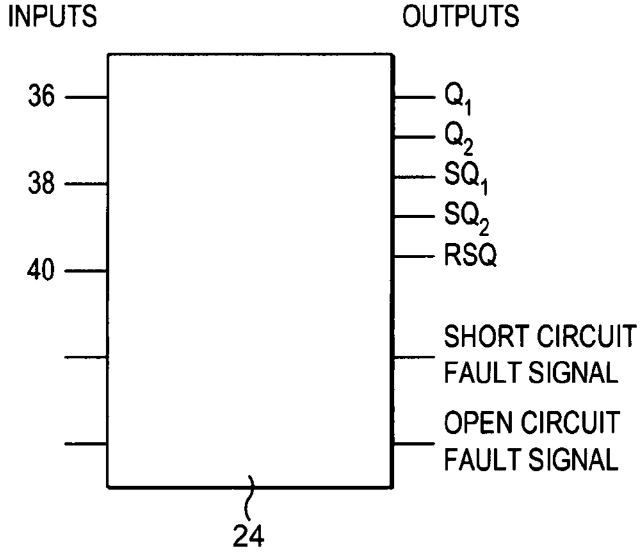

Referring to FIG. 3(*b*), the discharge phase $t_D$ is initiated at time $t_1$. To initiate the discharge phase $t_D$ at $t_1$, the microprocessor 24 generates a logic high discharge enable signal 36 and the current sensing and control means 28 outputs a logic high control signal 40 (FIG. 3(*d*)). The discharge enable signal 36 is combined with the control signal 40 through a logical AND gate in the microprocessor 24, and the resultant signal (36 AND 40=HIGH) is output by the microprocessor 24 to the discharge switch $Q_2$ causing it to close. FIG. 2*b* is a simplified diagram of the microprocessor 24 showing various inputs for the signals 36, 38 and 40, and various outputs for signals to control the operation of the switches $Q_1$, $Q_2$, $SQ_1$, $SQ_2$ and RSQ which are shown in FIG. 2*a*.

The current sensing and control means 28 senses the current $I_S$ as it flows through the middle current path 21 to discharge the actuator 16*a* or 16*b* of the selected injector 12*a* or 12*b*. The current sensing and control means 28 comprises a current comparator which compares the sensed current $I_S$ to a reference current and generates a logic low signal when $I_S$ rises above a predetermined upper threshold current $I_2$, and a logic high signal when $I_S$ falls below a predetermined lower threshold current $I_1$; i.e. the current sensing and control means 'chops' the control signal 40 between the logic low and the logic high when the predetermined threshold currents $I_1$ and $I_2$ are sensed.

Referring to FIG. 3(*a*), when the discharge phase $t_D$ is initiated at $t_1$ to initiate an injection of fuel, the sensed current $I_S$ gradually increases because of the inductance of the inductor $L_1$. This increase in current is indicated by reference numeral 41 on FIG. 3(*a*), and although this part of the graph is shown to have a negative gradient, current is increasing towards the predetermined threshold current $I_2$. At time $t_2$ the sensed current $I_S$ reaches the predetermined upper threshold current $I_2$, and hence the current sensing and control means 28 chops the control signal 40 (FIG. 3(*d*)) to a logic low. At time $t_2$, the resultant of the combined discharge enable signal 36 and control signal 40 (36 AND 40=LOW) causes the discharge switch $Q_2$ (FIG. 2*a*) to open. The current then begins to gradually fall because of the inductance of the inductor $L_1$ until $I_S$ reaches the predetermined lower threshold current $I_1$ at a time $t_3$. The current sensing and control means 28 senses that the current $I_S$ has reached the lower current threshold $I_1$ at $t_3$, and chops the control signal 40 to a logic high; the resultant combined signal (36 AND 40=HIGH) causes the discharge switch $Q_2$ to close again. This process continues for the period $t_D$.

The charge phase $t_C$ to terminate injection of fuel is analogous to the discharge phase $t_D$ described above and is therefore not explained in detail herein. During the charge phase $t_C$, the control signal 40 is combined with the charge enable signal 38 in the microprocessor 24 (FIG. 2*b*) and the resultant signal (38 AND 40) is applied to the charge switch $Q_1$ (FIG. 2*a*) to generate a current which varies between $I_3$ and $I_4$ over the period $t_C$ as shown in FIG. 3(*a*).

Look-up tables within the microprocessor's memory 26 produce values for the upper (more negative) current threshold $I_2$ during the discharge phase $t_D$; the lower current threshold $I_1$ during the discharge phase $t_D$ is calculated from a ratio of the upper current threshold $I_2$. Similarly, during the charge phase $t_C$, the upper current threshold $I_4$ is obtained from a look-up table and the lower current threshold $I_3$ is calculated from a ratio of the upper current threshold $I_4$. The values of $I_2$ and $I_4$ are selected depending on a number of factors including stack pressure, stack temperature, fuel demand and fuel rail pressure. The drive circuit 20, and hence fuel delivery, are controlled by the ECM 22. The ECM 22 incorporates strategies, which determine the required fueling and timing of injection pulses based on the current engine operating conditions, including torque, engine speed and operating temperature. The timing of when the injectors 12*a*, 12*b* open and close is determined by the ECM and is not important to the understanding of the present invention.

A test phase $t_T$, in which the actuators 16*a*, 16*b* are tested for short circuits, generally follows a charge phase $t_C$ at the end of the injection. If an actuator 16*a* or 16*b* develops a short circuit, it behaves electrically as a capacitive element with a resistive element in parallel. When the faulty actuator 16*a* or 16*b* is charged the capacitive element will gradually discharge itself through the resistive short circuit element. If no short circuit exists, the actuator 16*a* or 16*b* will remain charged.

In the first embodiment of the invention, a 'chop-feedback' method is used in the test phase $t_T$ to detect short circuits in the actuators 16*a* and 16*b*. In the chop-feedback method, a short charge pulse is performed on the actuators 16*a* and 16*b* after a predetermined time interval following the end of the charge phase $t_C$. For properly functioning actuators 16*a*, 16*b* i.e.

those without short circuits, no current should flow when this charge pulse is performed. If an actuator 16*a* and/or 16*b* has a short circuit it will have discharged itself to a certain extent through its short circuit resistance during the predetermined time interval following the charge phase. In which case a current will flow to recharge the discharged actuator or actuators 16*a* and/or 16*b* when the charge pulse is performed during the test phase. This current can be detected using the current sensing and control means 28 (FIG. 2*a*).

In common with both charge and discharge phases $t_C$, $t_D$, during a test phase $t_T$ the current sensing and control means 28 is programmed to output a control signal 40 which is variable between a high and a low state. The current sensing and control means 28 is further programmed to chop the control signal 40 if a current $I_S$ is sensed which reaches or exceeds a predetermined threshold current $I_{SC}$ indicative of a short circuit in one or both of the actuators 16*a*, 16*b*. $I_{SC}$ is chosen to be a value very close to zero amps because substantially no current should flow during the test phase if the injectors are all functioning correctly and none have short circuits. The control signal 40 is fed to an input of the microprocessor 24, as shown in FIG. 2*b*, and if the microprocessor 24 detects the presence of a chop in the control signal 40 during the test phase, the microprocessor 24 generates a warning signal to indicate that there is a short circuit in the injector bank 18.

If a warning signal is generated, the microprocessor 24 disables all further activity on the injector bank 18; this includes the disabling of all subsequent discharge, charge and regeneration phases. The lower the level of $I_{SC}$, the more robust the short circuit detection will be because higher resistance short circuits will be detectable (i.e. less current will flow during the test phase $t_T$). This chop-feedback method of detecting short circuits is described in more detail below with reference to FIGS. 3 to 6.

Referring again to FIG. 3(*c*), which shows the charge enable signal 38 output by the current sensing and control means 28, the test phase $t_T$ begins at time $t_4$, after a predetermined time period Δt following the end of the charge phase $t_C$. In practice, a crank angle is measured, and the test phase $t_T$ begins after the crank has rotated by a predetermined angle. The time period Δt therefore varies with engine speed and load, and decreases with increasing engine speed. This means that at low engine speeds, the resolution of the fault detection is maximised because there is more time available in which a charged injector can discharge through a short circuit. Therefore, higher resistance short circuits can be measured at lower engine speeds.

At time $t_4$ the microprocessor 24 switches the charge enable signal 38 (FIG. 3(*c*)) from a logic low to a logic high, such that a logic high signal pulse 42 is generated. The signal pulse 42 is of duration $t_T$, which is equivalent to $t_5-t_4$ ($t_5$ minus $t_4$). The signal pulse 42 is also shown in FIG. 4(*b*) and FIG. 5(*b*).

Figure 4:
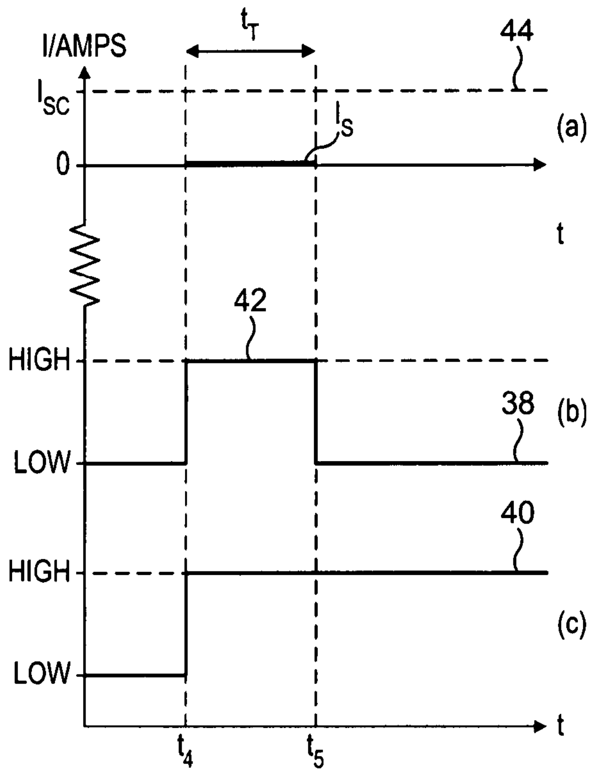
FIG. 4 shows ideal graphs of (a) a sensed current during a short circuit testing phase, (b) a charge enable signal pulse and (c) a chopped control signal for a situation where there are no short circuits in the injector arrangement of FIG. 1.
Figure 5:
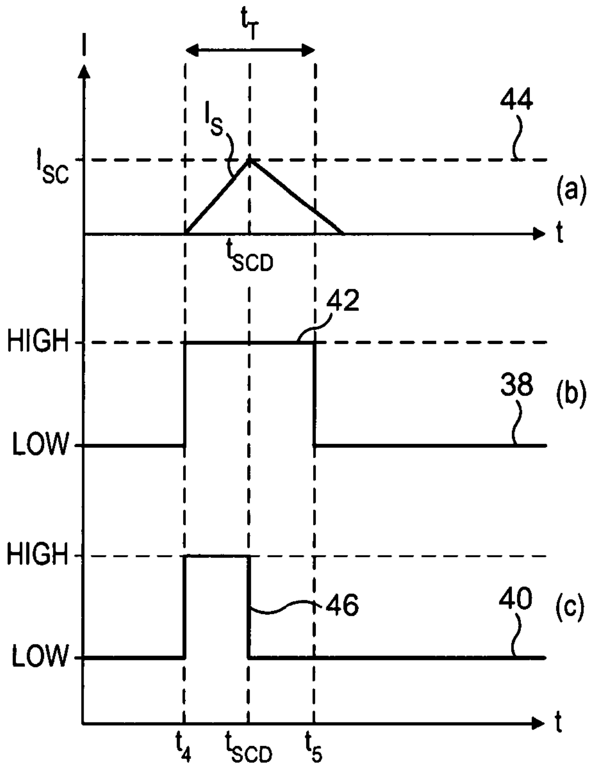
FIG. 5 shows ideal graphs of (a) a sensed current during a short circuit testing phase, (b) a charge enable signal pulse, and (c) a control signal for the situation where there is a short circuit in the injector arrangement of FIG. 1.
Figure 6:
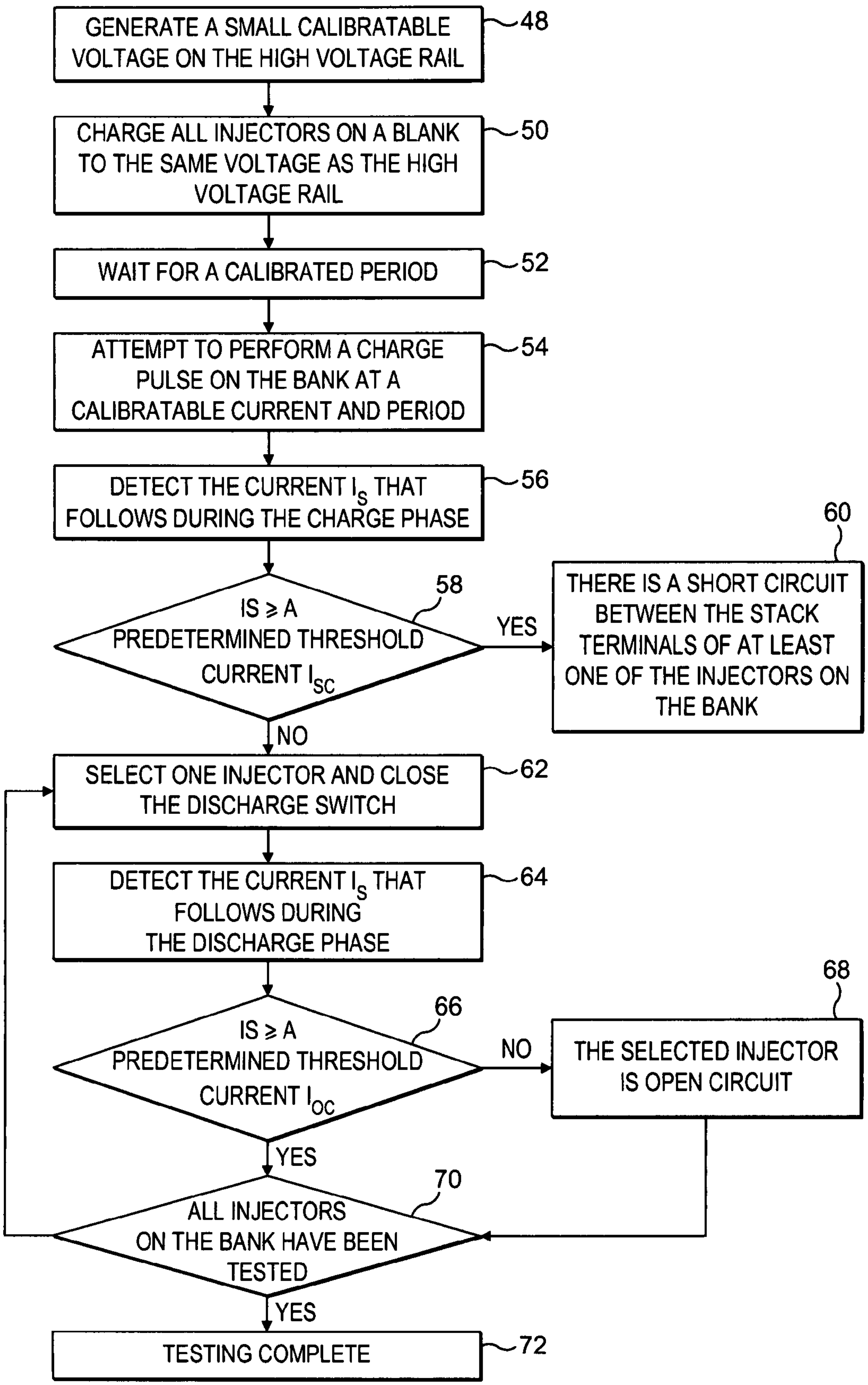
FIG. 6 is a flow chart showing the various diagnostic tests which are performed on the injectors at engine start-up.

FIGS. 4 and 5 show ideal graphs of (a) the sensed current $I_S$ during a test phase $t_T$, (b) the charge enable signal pulse 42 shown in FIG. 3(*c*), and (c) the control signal 40 during the test phase $t_T$. FIG. 4 represents a situation where both of the actuators 16*a*, 16*b* in the injector bank 18 are functioning correctly and neither has a short circuit, whereas FIG. 5 represents a situation where one or both of the actuators 16*a*, 16*b* has a short circuit.

Referring first to FIG. 4, at time $t_4$ the control signal 40 (FIG. 3(*c*)) is switched from a logic low to a logic high simultaneously with the charge enable signal 38 (FIG. 3(*b*)). The control signal 40 is combined with the charge enable signal 38 and the resultant combined signal (38+40=HIGH) causes the charge switch $Q_1$ (FIG. 2) to close at time $t_4$. It can be seen from FIG. 4(*a*) that the sensed current $I_S$ during the test phase $t_T$ is substantially zero amps and hence substantially no current flows during the test phase $t_T$ to recharge either actuator 16*a*, 16*b*. This is because both actuators 16*a* and 16*b* are still substantially fully charged at the beginning of the test phase $t_T$ because neither actuator 16*a* nor 16*b* has a short circuit.

As described earlier, the control signal 40 chops from high to low if the sensed current $I_S$ during the test phase $t_T$ reaches the predetermined threshold current $I_{SC}$, which is shown on FIG. 4(*a*) by the dashed line 44. The sensed current $I_S$ in FIG. 4(*a*) does not reach the threshold current $I_{SC}$, and hence the control signal 40 (FIG. 4(*c*)) is not chopped during the test phase $t_T$ and instead remains at a logic high. If no chop is detected in the control signal 40 during the test phase $t_T$, then the actuators 16*a*, 16*b* are functioning correctly and there are no short circuits in the injector bank 18. At $t_5$, the charge enable signal 38 switches from logic high to logic low, and the resultant combined signal (38 AND 40=LOW) causes the charge switch $Q_1$ to open and terminate the test phase $t_T$.

Reference is now made to FIG. 5 which represents the situation where one or more of the actuators 16*a* and/or 16*b* has a short circuit. As previously described with reference to FIG. 4, at the beginning of the short circuit testing phase (time $t_4$) the charge enable signal 38 and control signal 40 are both set to high and combined, with the effect that the charge switch $Q_1$ (FIG. 2*a*) closes. In the case shown in FIG. 5, however, one or both of the actuators 16*a*, 16*b* has discharged to a certain extent through a short circuit during the period Δt (FIG. 3) following the charge phase. The charge pulse 42 therefore causes a current to flow during the test phase $t_T$ to recharge the previously discharged actuator or actuators 16*a* and/or 16*b*.

FIG. 5(*a*) shows the current $I_S$ that flows during the test phase $t_T$ when one or both of the actuators 16*a*, 16*b* has a short circuit. At time $t_{SCD}$, the current $I_S$ reaches the predetermined upper threshold current $I_{SC}$ which causes the current sensing and control means 28 to chop 46 the control signal 40 (FIG. 5(*c*)) from a logic high to a logic low. The combined signal (38 AND 40=LOW) causes the charge switch $Q_1$ to open at $t_{SCD}$ and the faulty actuator begins to discharge again through its short circuit. As shown in FIG. 5(*a*), the sensed current $I_S$ continues to flow, but decreases, during a short period of time after the charge switch $Q_1$ opens at $t_{SCD}$; this is because of the inductance of the inductor $L_1$. The control signal 40 is fed back to the microprocessor 24. The presence of the chop 46 in the control signal 40 during the test phase $t_T$ is indicative of a short circuit in the injector bank 18 and causes the microprocessor 24 to generate a warning signal. Subsequent discharge, charge and regeneration phases are then suspended on the faulty injector bank 18 if a short circuit is detected.

In addition to detecting short circuits, the current sensing and control means 28 and the microprocessor 24 are also used to detect open circuit faults. Open circuit faults are tested for during the discharge phase $t_D$ and hence it is not necessary to introduce an additional phase into the normal operation of the drive circuit to test for open circuit faults. When the discharge switch $Q_2$ (FIG. 2*a*) is closed, and an injector, for example the first injector 12*a*, is selected for injection by closing the injector select switch $SQ_1$ (FIG. 2*a*), a current should flow through the actuator 16*a* of the selected injector 12*a*. If the actuator 16*a* of the selected injector 12*a* is open circuit, then substantially no current will flow during this discharge phase $t_D$.

Now, as explained earlier with reference to FIG. 3, the current that flows during the discharge phase $t_D$ is controlled between the lower and upper current levels $I_1$ and $I_2$ respectively using the control signal 40, such that when the upper current level $I_2$ is reached, the control signal 40 is chopped. If, therefore, the actuator 16*a* of the selected injector 12*a* is open circuit, the upper current threshold $I_2$ will not be reached during the discharge phase $t_D$ and hence the control signal 40 will not be chopped. The control signal 40 is fed back to the microprocessor 24, and if no chop is present in the control signal 40 during the discharge phase $t_D$, then the microprocessor 24 outputs an open circuit warning signal.

As an improvement to the open circuit detection method, a 'time window' may be introduced whereby an open circuit warning signal is generated if a chop has not occurred in the control signal 40 after a predetermined time interval following the commencement of the discharge phase $t_D$. If the selected injector 12*a* is found to be open circuit, then the injector 12*a* is disabled. The remaining injectors 12*b* on the injector bank 18 are not disabled and can continue normal operation. If all injectors 12*a*, 12*b* on the injector bank 18 are found to be open circuit, then the injector bank 18 is disabled entirely.

The method of detecting short circuits and open circuits using chop-feedback as described above is used during vehicle running so that any faults are detected as and when they occur. Although the detection of short circuits introduces an extra stage into the normal running of the drive circuit 20, there is always a period of time between charging the actuators 16*a*, 16*b* and the next injection from the injector bank 18; the short circuit testing phase is performed immediately before this next injection, and so does not adversely affect the normal running of the vehicle. The open circuit detection does not introduce any extra stages into the normal running of the drive circuit 20 because it is performed during a discharge phase.

In addition to detecting short and open circuit faults during the running of the vehicle, the drive circuit 20 in FIG. 2*a* is used to detect short and open circuit faults during engine start-up. The method is slightly different, however, during start-up, and will now be explained with reference to the flow chart in FIG. 6:

[step 48] At start-up, a small calibratable voltage is generated on the high voltage rail $V_H$. This voltage is typically about 75 volts, or about 20 volts above the voltage of the low voltage rail $V_L$; this is in contrast to the situation during normal running of the engine when the high voltage rail is at about 255 volts;

[step 50] each actuator 16*a*, 16*b* on the injector bank 18 is charged to the same voltage as the high voltage rail $V_H$;

[step 52] a calibratable period of time elapses during which any actuator 16*a* and/or 16*b* having a short circuit discharges to an extent;

[step 54] a charge pulse is performed on the actuators 16*a*, 16*b* at a calibratable current and for a calibratable period of time;

[step 56] the current sensing and control means 28 senses the current $I_S$ that flows during the charge pulse;

[step 58] the sensed current $I_S$ is compared to a predetermined threshold current $I_{SC}$ which is indicative of a short circuit in at least one of the actuators 16*a*, 16*b;*

[step 60] if the sensed current $I_S$ reaches or exceeds the predetermined threshold current $I_{SC}$, the current sensing and control means 28 chops the control signal 40 which is fed back to the microprocessor 24—a chop in the control signal 40 indicates that there is a short circuit in at least one of the actuators 16*a*, 16*b;*

[step 62] if the sensed current $I_S$ does not reach or exceed the predetermined threshold current $I_{SC}$ i.e. if no chop occurs in the control signal 40, then it is deemed that there is no short circuit, and the injectors 12*a*, 12*b* are then tested, one by one, for open circuit faults during successive discharge phases $t_D$ by selecting an injector 12*a*, 12*b* and closing the discharge switch $Q_2$;

[step 64] the current sensing and control means 28 senses the current $I_S$ that flows during the discharge phases $t_D$;

[step 66] the current sensing and control means 28 chops the control signal 40 if the sensed current $I_S$ reaches or exceeds a predetermined threshold current $I_{OC}$. The threshold current $I_{OC}$ which is used at start-up is lower than the threshold current $I_2$ which is used for open circuit testing during running. This is because the actuators 16*a*, 16*b* are charged to a lower level at start-up, and hence less current flows during a discharge phase $t_D$ at start-up;

[step 68] if the sensed current $I_S$ does not reach or exceed the predetermined threshold current $I_{OC}$, then a chop does not occur in the control signal 40; the absence of a chop in the control signal 40 indicates that the actuator 16*a* or 16*b* of the selected injector 12*a* or 12*b* is open circuit, and the microprocessor 24 accordingly generates a warning signal; if a warning signal is generated, then the actuator 16*a* or 16*b* of the selected injector 12*a* or 12*b* is open circuit and that injector is then disabled;

[step 70] if the sensed current $I_S$ reaches or exceeds the predetermined threshold current $I_{OC}$, then a chop occurs in the control signal 40; the presence of the chop indicates that the actuator 16*a* or 16*b* of the selected injector 12*a* or 12*b* is not open circuit, and the remaining injectors 12*a*-12N are each tested in turn until all the injectors 12*a*-12N on the injector bank 18 have been tested;

[step 72] testing is complete once all the injectors 12*a*-12N have been tested. The results of the tests will show if there is a short circuit in the injector bank 18, and if any of the actuators 16*a*, 16*b* is open circuit. Additionally, the tests can determine which one (if any) of the actuators 16*a*, 16*b* is open circuit.

Figure 7:
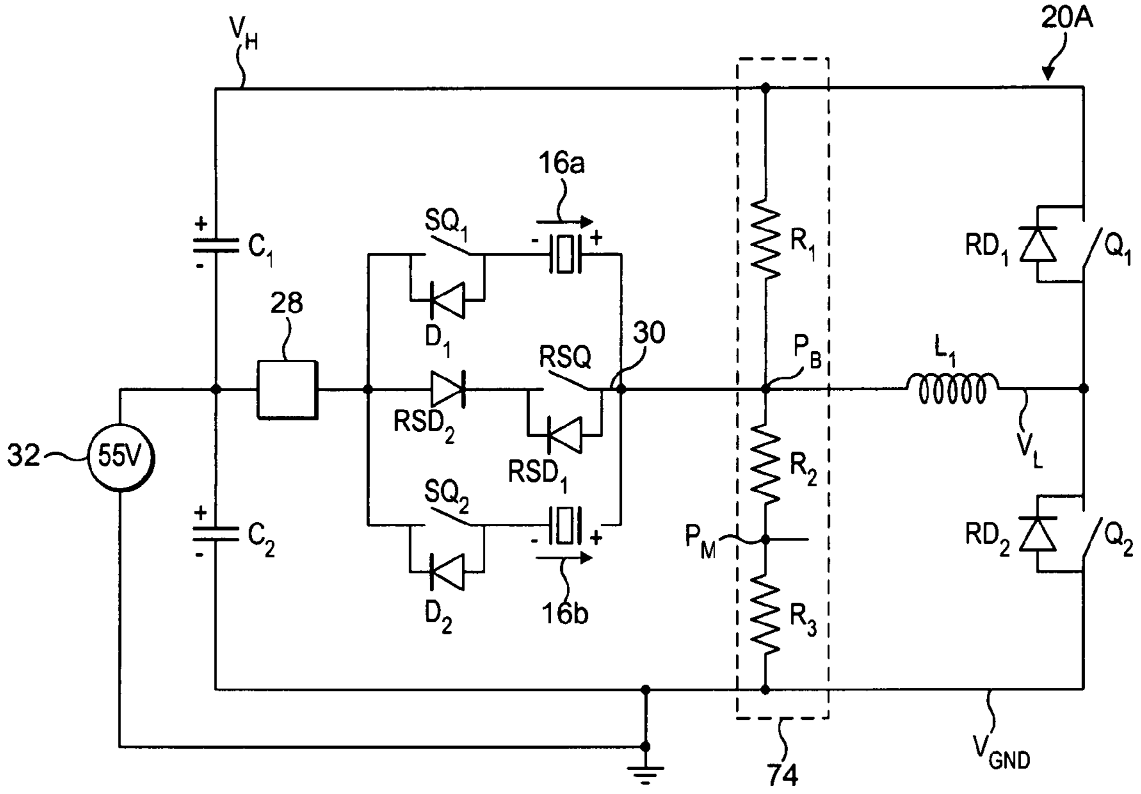
FIG. 7 is a circuit diagram illustrating a second embodiment of the drive circuit in FIG. 1.

In a second embodiment of the invention, an alternative method is used to detect short circuits in the injector arrangement. The alternative method will now be explained with reference to FIG. 7 which shows a second embodiment of the drive circuit 20A in FIG. 1. In FIG. 7, equivalent components have the same reference numerals as those in FIG. 2*a*. The drive circuit 20A is essentially the same as the drive circuit 20 in FIG. 2*a*, but with the addition of a resistive bias network 74 which is connected across the high voltage rail $V_H$ and ground rail $V_{GND}$ and which intersects the low voltage rail $V_L$ at a bias point $P_B$. The foregoing description applies equally to FIG. 7 as to FIG. 2*a* except in so far as it relates to the chop-feedback method of fault detection.

The resistive bias network 74 includes first, second and third resistors ($R_1$, $R_2$, $R_3$) connected together in series. The first resistor $R_1$ is connected between the high voltage rail $V_H$ and the bias point $P_B$ on the low voltage rail $V_L$, and the second and third resistors $R_2$ and $R_3$ are connected in series between the bias point $P_B$ and the ground rail $V_{GND}$. The second resistor $R_2$ is connected between the bias point $P_B$ and the third resistor $R_3$, and the third resistor $R_3$ is connected between the second resistor $R_2$ and the ground rail $V_{GND}$.

The resistive bias network 74 is used to determine the voltage on a selected actuator 16*a* or 16*b* immediately after a charge phase $t_C$, and again after a predetermined time period $\Delta t_A$ following the end of that charge phase $t_C$. The gradient of any voltage drop between the two readings will identify whether or not the selected actuator 16*a* or 16*b* has a short circuit, and the extent of this short circuit. The gradient of the voltage drop should be substantially zero for an actuator 16*a* or 16$b$ that is functioning correctly and that does not have a short circuit. Any voltage drop gradient which is greater than a predetermined amount will indicate that the selected actuator 16$a$ or 16$b$ has a short circuit.

The voltage on a selected actuator 16$a$ or 16$b$ is the potential $V_B$ at the bias point $P_B$ minus the voltage on the low voltage rail $V_L$ (55V in this example) when the relevant injector select switch $SQ_1$ or $SQ_2$ is closed. The resistive bias network 74 is used to measure the potential $V_M$ at a point $P_M$ which is between the second and third resistors $R_2$ and $R_3$ (by measuring the voltage across the third resistor $R_3$) and the measured voltage $V_M$ is used to calculate the potential $V_B$ at the bias point $P_B$ as follows:

$$V_M = \frac{V_B \times R_3}{R_2 + R_3} \tag{1}$$

and hence $$V_B = \frac{V_M \times (R_2 + R_3)}{R_3} \tag{2}$$

For example, the following method is used during a test phase $t_T$ to test the actuator 16$a$ of the first injector 12$a$ for a short circuit using the resistive bias network 74:

Immediately after a charge phase $t_C$, the first injector 12$a$ is selected by closing the injector select switch $SQ_1$; the charge switch $Q_1$ and discharge switch $Q_2$ remain open, and the voltage $V_{M1}$ across the third resistor $R_3$ is measured;

the potential at the bias point $P_B$, and hence the voltage $V_B$ on the actuator 16$a$ of the selected first injector 12$a$ immediately after the charge phase $t_C$, is calculated from $V_{M1}$, and the value of $V_B$ is stored in the memory 26 of the microprocessor 24 as a variable $V_{B1}$;

the injector 12$a$ is deselected by opening the injector select switch $SQ_1$ and a predetermined time period $\Delta t_A$ is allowed to elapse following the end of the charge phase—the predetermined time period $\Delta t_A$ may depend on a crank shaft angle and hence engine speed as described previously;

after the predetermined time period $\Delta t_A$, the injector 12$a$ is selected again by closing the injector select switch $SQ_1$, and the voltage $V_{M2}$ across $R_3$ is measured;

the value of $V_B$ after this predetermined time period $\Delta t_A$ is calculated from $V_{M1}$ and stored in the memory 26 of the microprocessor 24 as a variable $V_{B2}$;

a voltage drop $V_{B2}-V_{B1}$ is calculated and compared to a predetermined voltage drop value. If the calculated voltage drop ($V_{B2}-V_{B1}$) exceeds the predetermined voltage drop value, then the microprocessor 24 outputs a short circuit warning signal.

The magnitude of the voltage drop ($V_{B2}-V_{B1}$) is dependent on the resistance of the short circuit and on the time period $\Delta t_A$ which elapses between the voltage measurements. Higher resistance short circuits can be measured when the time period $\Delta t_A$ is longer because the faulty actuator will have had a longer period to discharge. This means that the resolution of the short circuit detection is maximised at lower engine speeds when the time period $\Delta t_A$ is longer.

As an alternative to comparing the voltage drop ($V_{B2}-V_{B1}$) to a predetermined voltage drop value, a voltage gradient may be calculated instead, as follows:

$$\frac{V_{B2} - V_{B1}}{\Delta t_A} \tag{3}$$

This voltage gradient does not depend on the time period $\Delta t_A$ which elapses between the voltage measurements. The voltage gradient is compared to a predetermined voltage gradient value and, if the calculated voltage gradient exceeds the predetermined voltage gradient value, then the microprocessor 24 outputs a short circuit warning signal.

In either case, if the microprocessor 24 generates a short circuit warning signal, the selected injector 12$a$ is disabled. If the calculated voltage drop is less than the predetermined voltage drop value, or if the calculated voltage gradient is less than the predetermined voltage gradient value, then a short circuit warning signal is not generated and the drive circuit may proceed to operate as normal. The remaining actuators 16$b$-16N are each tested for short circuits in a similar way to that just described.

The invention claimed is:

1. A method of detecting faults in an injector arrangement in an engine, the injector arrangement comprising at least one fuel injector having a piezoelectric actuator, and the method comprising:

charging the piezoelectric actuator during a charge phase ($t_C$);

attempting to recharge the piezoelectric actuator during a test phase ($t_T$), the test phase ($t_T$) commencing after a time interval ($\Delta t$) following the end of the charge phase ($t_C$);

sensing a current ($I_S$) that flows through the piezoelectric actuator (16$a$, 16$b$) during the test phase ($t_T$); and generating a short circuit fault signal if the sensed current ($I_S$) reaches a first predetermined threshold current ($I_{SC}$) which is indicative of a short circuit in the piezoelectric actuator.

2. The method of claim 1, further comprising:

generating a first control signal (40) during the test phase ($t_T$), the first control signal (40) being variable between a first state and a second state in response to the sensed current ($I_S$);

chopping the first control signal between the first state and the second state if the sensed current ($I_S$) reaches the first predetermined threshold current ($I_{SC}$); and generating the short circuit fault signal when a chop occurs in the first control signal during the test phase.

3. The method of claim 1, further comprising:

discharging the piezoelectric actuator during a discharge phase ($t_D$);

sensing the current ($I_S$) that flows through the piezoelectric actuator during the discharge phase ($t_D$); and generating an open circuit fault signal if the sensed current ($I_S$) during the discharge phase ($t_D$) does not reach a second predetermined threshold current ($I_2$,$I_{OC}$).

4. The method of claim 3, further comprising:

generating a second control signal during the discharge phase ($t_D$), the second control signal being variable between a first state and a second state in response to the sensed current ($I_S$) during the discharge phase ($t_D$);

chopping the second control signal between the first state and the second state if the sensed current ($I_S$) exceeds the second predetermined threshold current ($I_2$,$I_{OC}$); and generating an open circuit fault signal if a chop does not occur in the second control signal during the discharge phase ($t_D$).

5. The method of claim 4, wherein the open circuit fault signal is generated if a chop has not occurred in the second control signal after a predetermined time interval following the start ($t_1$) of the discharge phase ($t_D$).

6. The method of claim 1, wherein the time interval (Δt) depends on an angle of rotation of a crankshaft of the engine.

7. The method of claim 1, wherein the time interval (Δt) depends on an engine speed.

8. An apparatus for detecting faults in an injector arrangement, the injector arrangement comprising at least one fuel injector having a piezoelectric actuator, and the apparatus comprising:

charge arrangement ($C_1$) for charging the piezoelectric actuator;

current sensing arrangement for sensing a current ($I_S$) through the piezoelectric actuator; and control arrangement arranged to cause the charge arrangement ($C_1$) to connect to the piezoelectric actuator during the charge phase ($t_C$) and re-connect to the piezoelectric actuator during a test phase ($t_T$), the test phase ($t_T$) commencing after a time interval (Δt) following the charge phase ($t_C$);

wherein the control arrangement is further arranged to generate a short circuit fault signal if the sensed current ($I_S$) during the test phase ($t_T$) reaches a first predetermined threshold current ($I_{SC}$).

9. The apparatus of claim 8, further comprising an arrangement for generating a first control signal which is chopped between a first state and a second state when the sensed current ($I_S$) during the test phase ($t_T$) reaches the first predetermined threshold current ($I_{SC}$), wherein the control arrangement is arranged to generate the short circuit fault signal if a chop occurs in the first control signal during the test phase ($t_T$).

10. The apparatus of claim 8, further comprising:

discharge arrangement ($C_2$) for discharging the piezoelectric actuator during a discharge phase ($t_D$), wherein the control arrangement is arranged to generate an open circuit fault signal if the sensed current ($I_S$) during the discharge phase ($t_D$) does not exceed a second predetermined threshold current ($I_2$,$I_{OC}$).

11. The apparatus of claim 10, further comprising an arrangement for generating a second control signal which is chopped between a first state and a second state if the sensed current ($I_S$) during the discharge phase ($t_D$) exceeds the second predetermined threshold current ($I_2$,$I_{OC}$), wherein the control arrangement is arranged to generate the open circuit fault signal if a chop does not occur in the second control signal during the discharge phase ($t_D$).

12. The apparatus of claim 11, wherein the control arrangement is arranged to generate the open circuit fault signal if a chop has not occurred in the second control signal after a predetermined time interval following the start ($t_1$) of the discharge phase ($t_D$).

* * * * *